(12) United States Patent
Sattler et al.

(10) Patent No.: US 12,455,058 B2
(45) Date of Patent: Oct. 28, 2025

(54) METHOD FOR PRODUCING A SEMI-TRANSPARENT MOTOR-VEHICLE DESIGN ELEMENT

(71) Applicant: ZKW Group GmbH, Wieselburg (AT)

(72) Inventors: Jochen Sattler, St. Georgen am Ybbsfeld (AT); Thomas Haas, Mank (AT); Lukas Dienstbier, Wieselburg an der Erlauf (AT)

(73) Assignee: ZKW Group GmbH, Wieselburg (AT)

( * ) Notice: Subject to any disclaimer, the term of this patent is extended or adjusted under 35 U.S.C. 154(b) by 690 days.

(21) Appl. No.: 17/638,514

(22) PCT Filed: Sep. 3, 2020

(86) PCT No.: PCT/EP2020/074638
§ 371 (c)(1),
(2) Date: Feb. 25, 2022

(87) PCT Pub. No.: WO2021/043922
PCT Pub. Date: Mar. 11, 2021

(65) Prior Publication Data
US 2022/0333755 A1    Oct. 20, 2022

(30) Foreign Application Priority Data
Sep. 4, 2019    (WO) .................. PCT/EP2019/073608

(51) Int. Cl.
*F21S 41/50*    (2018.01)
*B60Q 1/00*    (2006.01)
(Continued)

(52) U.S. Cl.
CPC ............ *F21S 41/50* (2018.01); *B60Q 1/0023* (2013.01); *B60Q 1/0076* (2013.01); *B60Q 1/04* (2013.01);
(Continued)

(58) Field of Classification Search
CPC .... G02B 6/0073; F21V 19/001; F21S 41/148; F21S 41/192; F21S 45/43; F21S 45/48;
(Continued)

(56) References Cited

U.S. PATENT DOCUMENTS 4,923,297 A * 5/1990 Arndt ....................... A61B 3/12
                                                                351/208
4,965,950 A    10/1990 Yamada
(Continued)

FOREIGN PATENT DOCUMENTS

DE    4106440 A *   9/1991   ............... B44C 1/00
EP    0756131 A1    1/1997
(Continued)

OTHER PUBLICATIONS

Machine English translation of DE-4106440-A (Year: 1991).*
(Continued)

*Primary Examiner* — Jeffrey M Wollschlager
*Assistant Examiner* — Edgaredmanuel Troche
(74) *Attorney, Agent, or Firm* — Eversheds Sutherland (US) LLP

(57) ABSTRACT

The invention relates to a method for producing a semi-transparent motor vehicle design element (3), comprising the following steps:
A providing a dimensionally stable, at least partially light-permeable substrate (1) which is heat-resistant for a temperature of at least 60° C., the substrate (1) having a front side (1a) and a rear side (1b),
B introducing the substrate (1) into a vacuum chamber (2) and applying a first metallic semi-transparent layer (L1) by means of a PVD process to the substrate (1) according to step a) which is situated in the vacuum chamber (2), and
C applying a light-impermeable cover layer (LD) to the front or rear side (1a, 1b) of the substrate (1), the
(Continued)

light-impermeable cover layer (LD) containing at least one light-permeable opening (8) for reproducing at least one graphical symbol (SYM), steps B and C being carried out such that light (LSQ) passing through the at least one opening (8) in the light-impermeable cover layer (LD) from the rear side (1b) towards the front side (1a) of the substrate (1) is incident on the first metallic semi-transparent layer (L1) and at least partially passes outwards through the first metallic semi-transparent layer (L1) in order to project the at least one graphical symbol (SYM) represented by the at least one opening (8).

15 Claims, 12 Drawing Sheets

(51) Int. Cl.
| | | |
|---|---|---|
| *B60Q 1/04* | (2006.01) | |
| *B60Q 1/34* | (2006.01) | |
| *B60R 13/00* | (2006.01) | |
| *B60R 13/04* | (2006.01) | |
| *C03C 17/36* | (2006.01) | |
| *C23C 14/00* | (2006.01) | |
| *C23C 14/18* | (2006.01) | |
| *C23C 14/20* | (2006.01) | |
| *C23C 14/58* | (2006.01) | |
| *C23C 28/00* | (2006.01) | |
| *F21S 43/50* | (2018.01) | |

(52) U.S. Cl.
CPC .............. *B60Q 1/34* (2013.01); *B60R 13/005* (2013.01); *B60R 13/04* (2013.01); *C03C 17/3649* (2013.01); *C23C 14/0015* (2013.01); *C23C 14/0036* (2013.01); *C23C 14/185* (2013.01); *C23C 14/205* (2013.01); *C23C 14/5873* (2013.01); *C23C 28/345* (2013.01); *F21S 43/50* (2018.01); *C03C 2217/258* (2013.01); *C03C 2217/72* (2013.01); *C03C 2218/155* (2013.01); *C03C 2218/328* (2013.01)

(58) Field of Classification Search
CPC ...... B60Q 1/0023; B60Q 1/0076; B60Q 1/04; B60Q 1/26; B60Q 1/34; B60Q 2400/30; B60R 1/1207; B60R 13/005; B60R 13/04; C03C 17/3605; C03C 17/3649; C03C 17/3657; C03C 17/3684; C03C 2217/258; C03C 2217/72; C03C 2218/155; C03C 2218/328; C03C 17/001; C03C 17/09; C03C 2218/153; C23C 14/0015; C23C 14/0036; C23C 14/028; C23C 14/185; C23C 14/205; C23C 14/34; C23C 14/5813; C23C 14/5873; C23C 28/322; C23C 28/345

See application file for complete search history.

(56) References Cited

U.S. PATENT DOCUMENTS

| | | | |
|---|---|---|---|
| 2001/0040393 A1* | 11/2001 | Sano ................. | G09F 13/18 |
| | | | 296/209 |
| 2009/0286072 A1* | 11/2009 | Kuchler ............. | B60Q 3/14 |
| | | | 428/411.1 |
| 2011/0310610 A1 | 12/2011 | Brown et al. | |
| 2012/0280528 A1 | 11/2012 | Dellock et al. | |
| 2014/0147652 A1* | 5/2014 | Bhatt ................. | G02B 1/046 |
| | | | 428/221 |
| 2017/0015802 A1* | 1/2017 | Hall ................... | C23C 14/205 |
| 2017/0043709 A1* | 2/2017 | Dellock ............. | F21S 43/19 |
| 2017/0227183 A1* | 8/2017 | Cho ................... | F21S 43/28135 |
| 2018/0027634 A1 | 1/2018 | Dalavayi | |
| 2018/0065537 A1 | 3/2018 | Abrams et al. | |
| 2018/0356563 A1* | 12/2018 | Singh ................. | C23C 14/542 |
| 2019/0023195 A1* | 1/2019 | Khayat .............. | B60R 13/005 |
| 2019/0112698 A1* | 4/2019 | Hu ..................... | C23C 14/3442 |

FOREIGN PATENT DOCUMENTS

| | | | | |
|---|---|---|---|---|
| KR | 20100081093 A | | 7/2010 | |
| WO | WO-2018225029 A1 | * | 12/2018 | .......... B41M 5/0023 |

OTHER PUBLICATIONS

NPL_1; "British Plastics Federation—Polycarbonate PC"; retreived from https://web.archive.org/web/20081218144918/https://www.bpf.co.uk/plastipedia/polymers/Polycarbonate.aspx. (Year: 2008).*

* cited by examiner

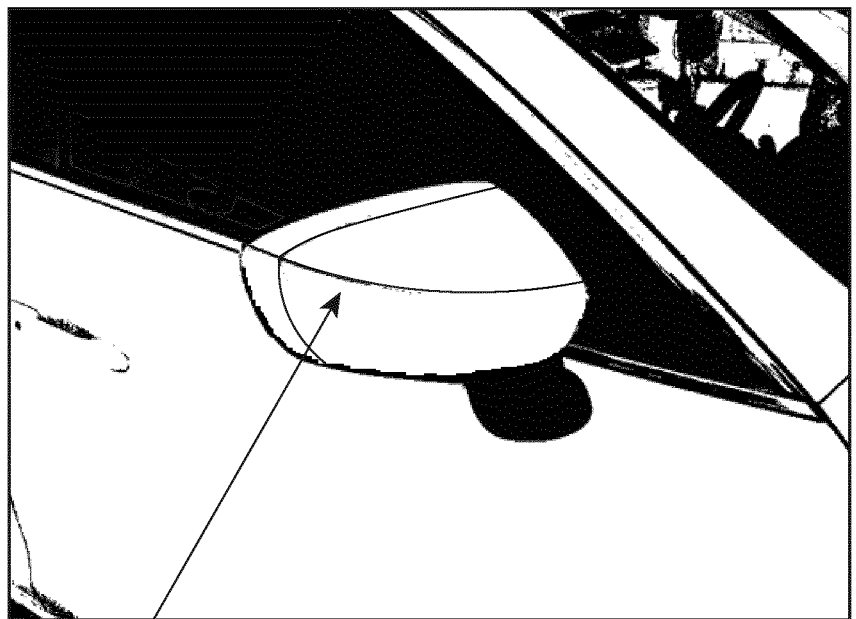
10b  Fig. 15a
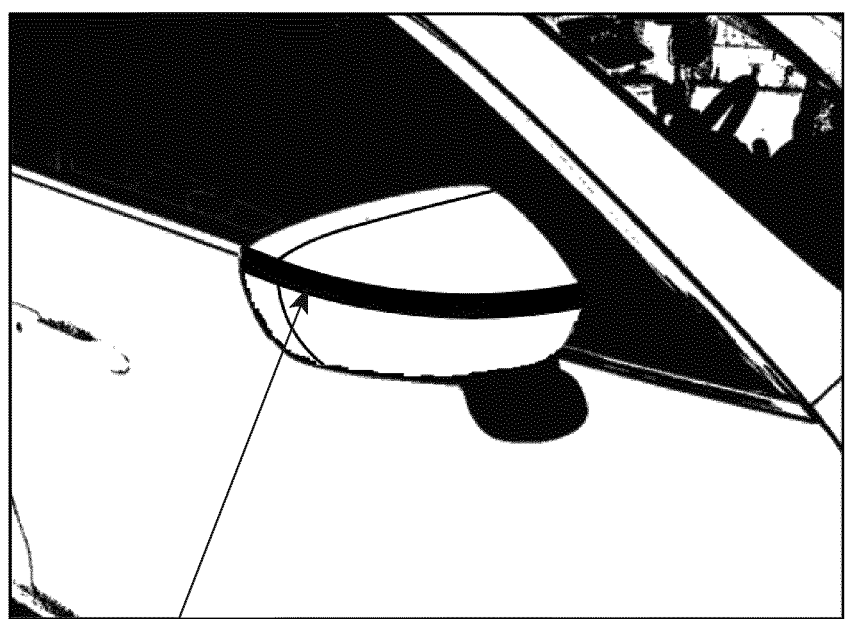
10b  Fig. 15b

METHOD FOR PRODUCING A SEMI-TRANSPARENT MOTOR-VEHICLE DESIGN ELEMENT

The invention relates to methods for producing a semi-transparent motor vehicle design element.

The invention also relates to a method for producing a display or signalling element.

In addition, the invention relates to a motor vehicle design element produced by the method according to the invention, to a display or signalling element, and to a vehicle headlight comprising a motor vehicle design element design element according to the invention and to a motor vehicle comprising a motor vehicle design element according to the invention.

Motor vehicle design elements which are in particular intended to be coloured or to have matt or glossy areas are typically designed as a plastic component in which the final appearance of the surfaces is generally defined by lacquering with corresponding lacquers. In this way, coloured, glossy or matt vehicle headlight design elements can be produced.

A disadvantage of conventionally produced motor vehicle design elements lies in that lacquers generally have a considerable layer thickness, which cannot be below a minimum amount, in order to have covering properties; the layer thicknesses can typically be over 100 micrometres or more in total. On the one hand, the application of lacquers is time-consuming, on the other hand, the surface structure of the plastic component is covered and not fully reproduced by the required layer thickness of a lacquer. The colour impressions and colour effects which can be achieved by lacquers are also limited owing to their composition and the type of application; for cost reasons, only body colours can typically be applied to the substrates. Body colours are colours in which the colour impression is produced by absorption of individual colour components of the light incident on the body. Optimisations of the properties of lacquer coatings were previously achieved by changing the lacquering methods and the composition of the lacquers to be applied.

Therefore, one object of the invention consists in creating a method for producing a motor vehicle design element which has an improved optical appearance.

This object is achieved with a method of the type mentioned in the introduction, by providing the following steps according to the invention:

A providing a dimensionally stable, at least partially light-permeable substrate which is heat-resistant for a temperature of at least 60° C., the substrate having a front side and a rear side, B introducing the substrate into a vacuum chamber and applying a first metallic semi-transparent layer by means of a PVD process to the substrate according to step a) which is situated in the vacuum chamber.

The use of a PVD process is a complete departure from previous methods of coating vehicle headlight design elements. As mentioned in the introduction, optical specifications of the design elements were previously typically implemented by designing an appropriate lacquer coating, with the disadvantages and limitations mentioned in the introduction. However, the use of the PVD process allows extremely small layer thicknesses to be applied, and the colouring is achieved not only by body colours but also by interference effects. In this way, for example, colour impressions and colour effects of metallic appearance can be achieved on at least partially light-permeable areas.

In other words, the present invention allows a metallic colour coating of at least partially light-permeable plastic substrates and also allows the production of different cold and warm design lights. The expression "light-permeable" refers to light in a wavelength range which is visible to the human eye.

The expression "semi-transparent layer" means that this layer allows light passing through this layer from the rear side towards the front side to pass through with a transmittance between for example 10% and 90%. The expressions "rear side" and "front side" denote mutually opposing sides of the substrate and of the motor vehicle design element resulting therefrom. The rear side can be a first side, and the front side can be a second side. The direction statements "front" and "rear" are therefore freely selectable from the standpoint of the substrate and can in principle be exchanged; only in connection with further features still to be mentioned below are certain properties and layer superstructures assigned to said sides. As long as the motor vehicle design element is used in conjunction with an active light source which is designed to shine through the motor vehicle design element at least partially, the term "rear side" denotes the side of the motor vehicle design element which is assigned to this light source and can be irradiated by the light source so that light emitted by the light source propagates in the substrate through the motor vehicle design element from the rear side towards the front side and exits from the substrate or the motor vehicle design element at the front side.

In particular, it can be provided for the first layer to be designed such that the first layer reflects light which is incident on the first layer from the front side towards the rear side of the substrate. In this way, a type of two-way mirror can be created.

Preferably, it can be provided for the first layer to have a reflectance of at least 50% and/or a transmittance of at most 50% in a light propagation direction from the front side towards the rear side of the substrate. The front side can be provided with anisotropic reflection properties so that light which is incident on the front side from the front side towards the rear side is reflected to a higher degree than light propagating in the opposite direction. The expression "transmittance" (generally denoted in the technical literature with the Greek symbol "$\tau$") means the inverse ratio of light incident on a medium (i.e. the light incident on the light input face of the medium) to radiant flux allowed through. In this case, the light is incident on the light input face of the medium at a right angle. The expression "reflectance" (generally denoted in the technical literature with the Greek symbol "$\rho$") means the inverse ratio of radiant flux incident on a medium to that reflected. In the present case, therefore, light is assumed to be incident on the surface in question normally, and the stated values apply at least to a wavelength range between 400 nm and 800 nm.

In particular, it can be provided for the first layer to have a reflectance of at most 80% and/or a transmittance of at least 20% in a light propagation direction from the rear side towards the front side of the substrate.

Preferably, it can be provided for the method also to comprise the following step:

C applying a light-absorbent cover layer to the front or rear side of the substrate, the light-impermeable cover layer containing at least one light-permeable opening for reproducing at least one graphical symbol, steps B and C being carried out such that light passing through the at least one opening in the light-impermeable cover layer from the rear side towards the front side of the substrate is incident on the first metallic semi-transparent layer and at least partially passes outwards through the first metallic semi-transparent layer in order to project the at least one graphical symbol represented by the at least one opening. The order of steps B and C can in principle be chosen freely. The graphical symbol can also be simply a square, a circle, a strip etc. to indicate a fuel tank cap, for example. In addition, it can be provided for the light-impermeable cover layer to be applied by means of a PVD process, the at least one light-permeable opening being exposed by lasering. With metallic sputtered layers, the layer thickness for achieving this opacity is very small in comparison with other materials.

The expression "light-impermeable" means that the transmittance is less than or equal to 0.001, i.e. at most one per mille or 0.1%. In particular, the transmittance of "light-impermeable" objects within the meaning of the present invention can be 0.01%, 0.001% or even exactly 0%. The light-impermeable cover layer can also be light-absorbent. The cover layer can also be light-absorbent.

Furthermore, it can be provided for the light-impermeable cover layer to be in the form of a film. In this case, it can be an adhesively bondable film or else a deep-drawn film which is sprayed onto the substrate.

Materials for these films can be a wide variety of plastics; PMMA and PC are common.

In particular, it can be provided for the light-impermeable cover layer to be arranged on the rear side of the substrate.

Preferably, it can be provided for the light-impermeable cover layer to be arranged on the front side of the substrate.

In particular, it can be provided for the first layer to be arranged directly on the light-absorbent cover layer.

Preferably, it can be provided for the light-impermeable cover layer to be arranged on the rear side of the substrate.

In particular, it can be provided for the light-impermeable cover layer to be light-impermeable.

Preferably, it can be provided for the first layer to be arranged on the rear side of the substrate.

In particular, it can be provided for the first layer to be arranged on the front side of the substrate.

Preferably, it can be provided for the first layer to have a layer thickness between 2 nm and 300 nm.

In particular, it can be provided for the pressure of the vacuum chamber to be less than $10^{-2}$ mbar, preferably less than $10^{-3}$ mbar.

Preferably, it can be provided for the method also to comprise the following step:
D) applying a colouring second layer which covers the first layer, the second layer being at least partially light-permeable and designed such that light incident on the design element from the front side towards the rear side of the substrate is at least partially manipulated by interference, in particular destructive interference, in that the light beams which are reflected by the surface of the second layer are superimposed on the light beams which are reflected by the surface of the first layer. In addition, it can be provided for the second layer to be largely free of body colours, a body colour being a colour which becomes perceptible by at least partial absorption of spectra of visible light, the extent of the absorption of the colour components red, green and blue being unequal, wherein the second layer is designed such that the light reflected by the motor vehicle design element is manipulated in its colour composition by interference of at least one spectral component of the light. The expression "largely free" means that the colour effect mainly results from the interference and not from absorption of spectral components in the material, i.e. the absorptance to visible light within the frequency spectrum (400 nm to 800 nm wavelength) of visible light varies below 30%, for example.

Preferably, it can be provided for the application of the second layer to take place by sputtering, in which for example titanium is provided by a sputtering target and reacts with oxygen as the reactive gas introduced into the sputtering process and thus forms a titanium dioxide layer on the first layer, the layer thickness of the second layer being predefined by predefining the coating rate and/or the duration of the coating process. For example, a large number of (interference) colours (blue, gold, purple, green, yellow) can be produced by combining titanium (ejected from the sputtering target) and oxygen (as reactive gas), the actual colour depending on the thickness of the coating. Exemplary "recipes" for an overall coating structure can read as follows:

Select a suitable sputtering target which allows a metallic layer to be applied, wherein the metal of the metallic layer can be selected from the following list: {titanium, chromium, silicon, aluminium, stainless steel, copper, zirconium}. Optionally, a base layer (e.g. HMDSO by means of PECVD) can be applied to a substrate first. The so-called first layer follows, consisting of one of the metals mentioned or mixtures thereof, without a reactive gas. A second layer then follows, using a reactive gas, e.g., oxygen. A metal ceramic is produced by the chemical reaction of the metal with the reactive gas. These metal ceramics usually have very different properties from the pure metals, such as a high degree of hardness, a high degree of chemical resistance, and very different optical properties (e.g. transparency), which allows colour to be generated by interference. The properties of these metal ceramics cannot necessarily be regarded as equivalent to the properties of the same material as bulk material, owing to the small layer thickness (for example, titanium dioxide is no longer transparent in larger thicknesses but is a white powder or white pigment). Preferably, the sputtering target remains unchanged in the process, i.e. the same starting metal can be used as for the first layer. After the second layer has been applied, the aforementioned protective layer can optionally be applied. The first layer and the second layer are selected such that an at least partial light-permeability to light propagating through the substrate and the layers from the rear side towards the front side is ensured.

Alternatively, it can be provided for the second layer to consist of the same starting material as the first layer.

In particular, it can be provided for the application of the second colouring layer to take place while adding a reactive gas during the sputtering process. In contrast to the non-reactive sputtering process, in the reactive sputtering process a further gas (or gas mixture) is provided in the sputtering chamber in addition to the inert gas (e.g. argon) necessary for the sputtering, said further gas reacting with the material ejected from the target and thus changing the deposited layer (for example, titanium ejected from a sputtering target can react with oxygen to form titanium dioxide and thus form a titanium dioxide layer on the substrate or the first layer). Such layers can have a considerably changed property spectrum owing to the chemical change resulting from the reaction with the reaction gas (e.g. metal can suddenly assume ceramic- or glass-like properties). Any gas which can react with the metal is actually considered as the reactive gas. Usually, however, oxygen, nitrogen or carbon-containing gases (CO or acetylene or methane) or mixtures thereof are used.

In particular, it can be provided for a semi-transparent effect reflective layer to be arranged after the first layer, viewed in a direction oriented from the rear side towards the front side of the substrate, to partially reflect light beams back to the first layer or optionally a second layer, wherein said effect reflective layer is arranged at a distance of at least 1 mm from the first layer, wherein light-permeable material is arranged between the effect reflective layer and the first layer so that light beams passing through the first layer from the rear side towards the front side of the substrate can be reflected between the first layer and the effect reflective layer and can be emitted outwards through the effect reflective layer. In conjunction with the light-permeable opening in the light-impermeable cover layer, graphical symbols can be displayed impressively therewith.

In contrast to document EP 0 256 635 A2, which discloses a structure which generates "ghost images" by means of multiply reflective regions, an essential difference of this aspect of the invention consists—apart from the different field of application (alignment of measuring instruments)—in that the "mask"—that is, the opening defining the image—is introduced directly into the lower light-impermeable layer (which can be formed e.g. as a fully reflective (not semi-transparent) metal layer), in contrast to EP 0 256 635 A2. In the present invention, according to the present aspect, the mask can be designed as an opening in a light-impermeable layer which is applied behind the completely continuous first semi-transparent metal layer L1. In other words, the layer sequence in this aspect of the present invention is as follows: light-impermeable (optionally absorbent) layer LD/substrate 1/semi-transparent metal layer L1 (L1 and 1 can also be the other way round in some circumstances)/optional colouring layer L2 (this can be applied directly to L1)/light-permeable material 1'/semi-transparent effect reflective layer L3/optional coating CL. So that a metal layer is semi-transparent, layer thicknesses in the region of a few nm (penetration depth) can be provided. A large number of metals are considered as material, such as Al, Au, Ag, Cu, Cr etc. It should also be mentioned at this point that in EP 0 256 635 A2 it is stated that the opening in the screen of EP 0 256 635 is in the form of the smallest possible "pinhole", which is used to align a measuring instrument. However, the present invention relates to the reproduction of a graphical symbol and has nothing to do with the alignment of measuring instruments. In addition, the following can be found in paragraph [0023] of EP 0 256 635 A2: "The rear surface of double reflective mirror 18 has a coating 40 which is semitransparent, commonly used as a beam-splitter. It is composed preferably of dielectric, non-absorbing, coating materials such as magnesium fluoride and silicon oxide." However, a dielectric coating cannot be used to achieve a reflective (metallic) effect, which is essential in the present optional aspect of the invention, however, and can be produced only by means of a thin metallic layer as provided in the dependent claim and not by means of the measures according to EP 0 256 635 A2.

In addition, it can be provided for the effect reflective layer to have a reflectance of at least 50% in respect of light which is incident from the front side towards the rear side of the substrate.

In particular, it can be provided for the effect reflective layer to have a transmittance of at least 50% in respect of light which enters the effect reflective layer from the front side towards the rear side of the substrate.

Preferably, it can be provided for the first layer and the effect reflective layer to be inclined to each other at least in some sections to change the angles of the light beams reflected between these layers. This results in an optical change, in particular a distortion, of the mirror images.

In particular, it can be provided for the PVD process according to step B) to be designed as a sputtering process.

In addition, it can be provided for the application and formation of the first layer according to step C) to take place without a reactive gas during the sputtering process.

In particular, it can be provided for the temperature in steps B) and C) to be below 100° C., preferably below 70° C., particularly preferably below 60° C. As a result, the method according to the invention can also in principle be applied to substrates having a lower temperature resistance.

Preferably, it can be provided for the application of the second colouring layer according to step D) to take place by sputtering while adding a reactive gas, in particular oxygen.

In addition, it can be provided for the second layer to be obtained by providing titanium by means of a sputtering target, said titanium reacting with oxygen as the reactive gas introduced into the sputtering process and thus forming a titanium dioxide layer on the first layer, the layer thickness of the second layer being predefined by predefining the coating rate and/or the duration of the coating process.

In particular, it can be provided for the PVD process according to step B) to be designed as a thermal evaporation process. Further exemplary conceivable PVD methods are, for example, electron-beam physical vapour deposition, pulsed laser deposition, cathodic arc deposition.

In particular, it can be provided for the first layer to comprise aluminium. This first layer can be applied for example by a non-reactive sputtering process. Aluminium has a reflectance which can be defined precisely depending on the layer thickness and is therefore particularly well suited to use as the first layer.

The following non-reactive sputtering process which is suitable for applying the first layer is mentioned by way of example: Argon gas is let into the vacuum chamber (up to the desired pressure range e.g. $1\times10^{-4}$ mbar); a voltage is applied to the target (cathode)—the anode is usually formed by the chamber wall or the devices; the argon is ionised (to Ar+) by the voltage and is accelerated towards the cathode (negatively charged); the pulse is transferred to the atoms of the target by the (mechanical) impact of the argon ions—if there is enough energy, a portion of the target atoms detaches and flies into the space; if the pressure in the chamber is low enough, the range of the sputtered atoms is long enough for them to arrive at the substrate and condense there. The base material for the applied layers is present in the sputtering process as the target (usually metals, but ceramics can also be used).

Preferably, it can be provided for the first and optionally a second layer to be designed such that light incident on the layers from the front side towards the rear side of the substrate is reflected such that the at least one opening provided in the light-absorbent cover layer is not visible to the human eye if there is no backlighting. The expression backlighting means an arrangement in which light originating from an active light source provided therefor is radiated forwards through the opening through the rear side towards the front side.

In particular, it can be provided for a protective layer to be applied by means of plasma polymerisation over the first layer or optionally over a second layer covering the first layer, this protective layer in particular being a layer consisting of polyhexamethyldisiloxane. In a development of this aspect, it can be provided for the protective layer to be designed such that the light reflected by the motor vehicle design element is manipulated in its colour composition by interference of at least one spectral component of the light. To this end, this protective layer is at least partially transparent. The protective layer also increases the water vapour resistance and the mechanical resistance of the coating.

In particular, it can be provided for a base layer to be applied to the substrate before the application of a first layer according to step C). Said base layer can be the same material as that which can already be used as a protective layer, that is, e.g., a layer which is applied by means of plasma polymerisation (PECVD), wherein said protective layer can in particular be a layer consisting of hexamethyldisiloxane (HMDSO).

Preferably, it can be provided for the substrate to consist of a plastic, preferably of polycarbonate, polyester amide, polyether imide, ABS, technical thermoplastics or duroplast. Polyether imide has a certain intrinsic colour, which can be used intentionally in some cases or can be disruptive in others.

Alternatively, it can be provided for the substrate to consist of glass.

In particular, the side of the substrate to be coated with the first layer can have a surface design which is smooth at least in one section and is rough or structured in at least one other section. A rough surface can be designed e.g. as an area with a metallically brushed effect, the coating structure according to the invention being thin enough, in contrast to a conventional coating by means of lacquers, to show the roughness of the surface practically unchanged. Lacquer coatings, however, "blur" on the surface to be coated and cover such rough or structured surfaces owing to the greater layer thickness necessary for lacquers. Explained below are surface properties of screen elements, which are produced e.g. using injection-moulding methods or in which the substrate used for the screen element is produced using an injection-moulding method; the substrate can be a plastic, for example. As a result of unevenness in the surface e.g. of the injection-moulding die or other influences, the surface of each substrate has a minimum amount of unevenness. Texturing (which is also described in VDI standard 3400, for example), i.e. unevenness is produced in the surface. Negative shapes of this texturing can be introduced by suitable methods such as lasering/etching/stamping into the injection-moulding die used for producing the screen element and are correspondingly reproduced on the surface of the moulded substrate of the screen element. Alternatively, smooth substrates of screen elements can be provided directly with such texturing in a post-machining process in which the aforementioned methods, i.e. lasering/etching/stamping can also be used.

The extent of this unevenness can be measured using a technical variable, specifically the so-called roughness average Ra. The roughness average Ra indicates the average distance of a measurement point on the surface from the centre line. The centre line intersects the actual profile within the reference section such that the sum of the profile deviations in a parallel plane to the centre line is distributed over the length of the measurement section. The term "roughness average" is a generally recognised technical term which is regularly used in the literature and is thus known to the person skilled in the art.

In the present invention, the expression "smooth" means a surface which has a roughness average of at most 0.25 µm, i.e. Ra<=0.25.

The expression "rough" means a surface which has a roughness average of at least 2.0 µm, i.e. Ra>=2.0 µm. There can also be a maximum roughness value which is still technically favourable for the present purposes. The maximum roughness can be e.g. 25 µm, i.e. Ra<=25 µm.

The invention also relates to a method for producing a display or signalling element for a motor vehicle headlight, comprising a motor vehicle design element produced by a method according to the invention and at least one light source, the light source being designed to emit light outwards through the at least one rear side of the substrate and through the front side of the substrate and in the process to illuminate the semi-transparent first layer.

Preferably, it can be provided for the light source to be assigned a control device which is designed to switch the light source on and off for predefinable durations and thereby change the optical appearance of the display or signalling element between at least two states. In this way, a distinction can be made between e.g. a "cold design" and a "warm design".

The invention also relates to a motor vehicle design element, in particular produced by a method according to the invention, the motor vehicle design element comprising a dimensionally stable substrate, a metallic semi-transparent first layer further being arranged on the substrate.

In particular, it can be provided for a light-absorbent cover layer to be arranged on a front or rear side of the dimensionally stable substrate, wherein the light-impermeable cover layer contains at least one light-permeable opening for reproducing at least one graphical symbol, wherein the cover layer is placed in front of the metallic semi-transparent first layer in a direction from the rear side towards the front side of the substrate such that light passing through the at least one opening in the light-impermeable cover layer from the rear side towards the front side of the substrate is incident on the metallic semi-transparent first layer and at least partially passes outwards through the metallic semi-transparent first layer in order to project the at least one graphical symbol represented by the at least one opening. The light can be scattered on passing through the metallic layer.

Alternatively, an opening does not have to be provided. The entire visible area of the design element can thus be illuminated. In this way, area designs such as carbon optics or coloured motifs can be created. The light colour of the light source can additionally effect a substantial change in the appearance. Different sputtering materials influence the colour of the light passing through.

The invention further relates to a display or signalling element produced by a method according to the invention, comprising a light source which is designed to shine light from the rear side of the substrate through the front side of the substrate and through the at least one opening in the cover layer onto the first layer and at least partially through same.

Preferably, it can be provided for the light source to be a controllable light source, in particular an RGB light source, wherein the light intensity and/or light colour of the controllable light source can be changed over time.

In particular, it can be provided for the light source, the at least one opening and the first layer to be designed such that, when illuminated by the light source, an intermittent orange driving-direction-indicating signal can be emitted outwards. Other light functions can also be implemented.

The invention further relates to a vehicle headlight comprising a motor vehicle design element according to the invention and/or a display or signalling element according to the invention. The use of such a design element inside a vehicle headlight has the advantage that the design element is thus efficiently largely protected from environmental influences.

The invention further relates to a motor vehicle comprising a motor vehicle design element according to the invention and/or a display or signalling element according to the invention and/or a vehicle headlight according to the invention.

In particular, it can be provided for the motor vehicle to have
- at least one sensor for sensing the surroundings of the vehicle,
- at least one display or signalling element, and
- at least one control device, which is connected to the at least one sensor and the display or signalling element, for activating the light source of the display or signalling element, wherein the control device is designed, depending on persons sensed within the surroundings of the vehicle by means of the at least one sensor, to activate the light source of the display or signalling element for visual signal transfer towards the sensed person.

Alternatively, it can be provided for the motor vehicle to have multiple sensors and multiple display or signalling elements, wherein each sensor is assigned a display or signalling element, wherein the control device is designed to start a check routine of the sensors depending on a start signal, wherein a walk around the vehicle by a person walking around the vehicle is sensed by means of the sensors during the check routine, wherein display and/or signalling elements facing the person are switched between at least two optical states, in particular an active and a passive state, according to a predefinable pattern depending on a result of the sensor check, so that the functional state of the sensors can be communicated visually to the person checking the vehicle.

In principle, the devices mentioned according to the invention can be implemented in any parts of a vehicle. For example, door handles, fuel tank caps, the inner frame region, parts of the vehicle body etc. can be considered for this. As functions, for example a display of a battery state of an electric vehicle, a daytime running lamp function or a visualisation of temperature e.g. in ventilation opening design elements can be provided.

All the device features arising from the aforementioned method according to the invention and advantages resulting therefrom can also be part of the devices mentioned below. The invention also relates to a motor vehicle design element.

The invention is explained in more detail below using exemplary and non-limiting embodiments, which are illustrated in the drawings. In the figures, FIG. 1 shows a schematic diagram of a sputtering process by means of which the layers can be produced on a substrate by the method according to the invention, FIG. 2 shows a schematic diagram of a substrate, FIG. 3 shows a schematic diagram of the substrate comprising a base layer, FIG. 4 shows a schematic diagram of the substrate comprising a base layer and a first layer according to the invention, FIG. 5 shows a schematic diagram of the substrate comprising a base layer, a first layer and a second layer according to the invention, FIG. 6 shows a schematic diagram of the substrate comprising a base layer, a first layer, a second layer and a protective layer or an effect reflective layer according to the invention, FIGS. 7a and 7b show a schematic diagram of a display element according to the invention, comprising a light-impermeable cover layer, in a passive and an active operating state, respectively, FIG. 8 shows an exemplary method for forming an opening in a light-absorbent cover layer, FIGS. 9a and 9b show alternative designs of a display element according to the invention, in a passive and an active operating state, respectively, FIGS. 10a and 10b show further alternative designs of a display element according to the invention, in a passive and an active operating state, respectively, FIG. 11 shows a variant of a display element according to the invention comprising an effect reflective layer, FIGS. 12a and 12b show exemplary effects of an inclination of the effect reflective layer of a display element within the meaning of FIG. 11, FIG. 13 shows a motor vehicle headlight according to the invention, FIGS. 14a and 14b show a motor vehicle comprising exemplary signalling elements according to the invention, in a passive and an active operating state, respectively, FIGS. 15a and 15b show a signalling element according to the invention in the form of a flashing light integrated into a rear-view mirror, and FIG. 16 shows an exemplary motor vehicle comprising a number of signalling elements according to the invention for use in a check routine.

In the following figures, identical reference signs denote identical features, unless otherwise indicated.

FIG. 1 shows a schematic diagram of a sputtering process by means of which the layers can be produced on a substrate 1 by the method according to the invention. This method is suitable for producing a light-impermeable motor vehicle design element 3 (see FIGS. 4, 5 and 6) and comprises the following steps:
- A providing a dimensionally stable, at least partially light-permeable substrate 1 which is heat-resistant for a temperature of at least 60° C., the substrate 1 having a front side and a rear side,
- B introducing the substrate 1 into a vacuum chamber 2 and applying a first metallic semi-transparent layer L1 by means of a PVD process to the substrate 1 according to step a) which is situated in the vacuum chamber 2.

The PVD process according to step B is preferably designed as a sputtering process. The example according to FIG. 1 shows different variants by which layers can be applied to the substrate 1. Generally, argon gas 4 is let into the vacuum chamber 2 (up to the desired pressure range of e.g. $1 \times 10^{-4}$ mbar), and a voltage is applied to a target 5 in relation to the chamber wall 6, for example. As a result, argon is ionised (to Ar+) and is accelerated towards the cathode 5 (negatively charged). The pulse is transferred to the atoms of the target by the (mechanical) impact of the argon ions—if there is enough energy, a portion of the target atoms detaches and flies into the space; if the pressure in the chamber 2 is low enough, the range of the sputtered atoms is long enough for them to arrive at the substrate 1 and condense there. The base material for the applied layers is present in the sputtering process as the target 5 (usually metals, but ceramics can also be used). In FIG. 1, two different possibilities are shown as the target 5—the target can thus consist of aluminium or else of titanium. Aluminium is very well suited to producing the aforementioned first layer L1. When the first layer L1 is produced, the presence of a reactive gas is omitted. In this case, the aluminium condenses on the target in pure form. However, FIG. 1 also shows an alternative scenario, specifically one in which a titanium target is used, for example, and the sputtered titanium material or titanium atoms react with a reactive gas 7—in this case oxygen—to form titanium dioxide and condense on the substrate 1. In this way, a second layer L2 (see FIGS. 5 and 6) can be produced. Typically, the first layer L1 is applied first in a non-reactive sputtering process, and then, after introduction of a reactive gas, the second layer L2 is applied over the first layer L1.

The composition and layer thickness of the first layer L1 and—if present—the second layer are selected such that they are still at least partially permeable to light passing through the substrate 1 from the rear side 1b of the substrate 1 towards the front side 1b.

Figure 1:
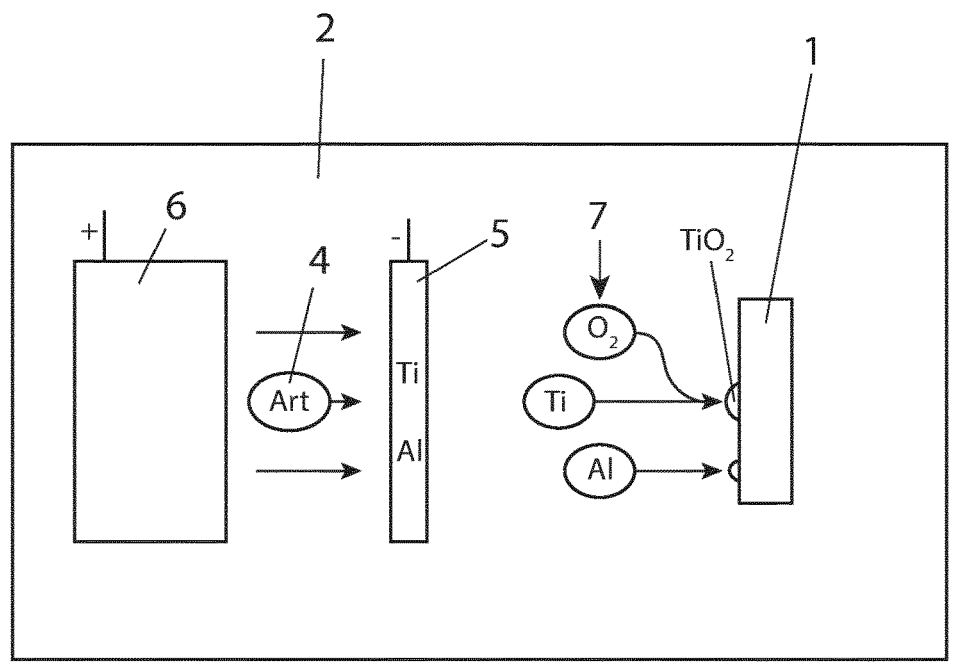
Figure 2:
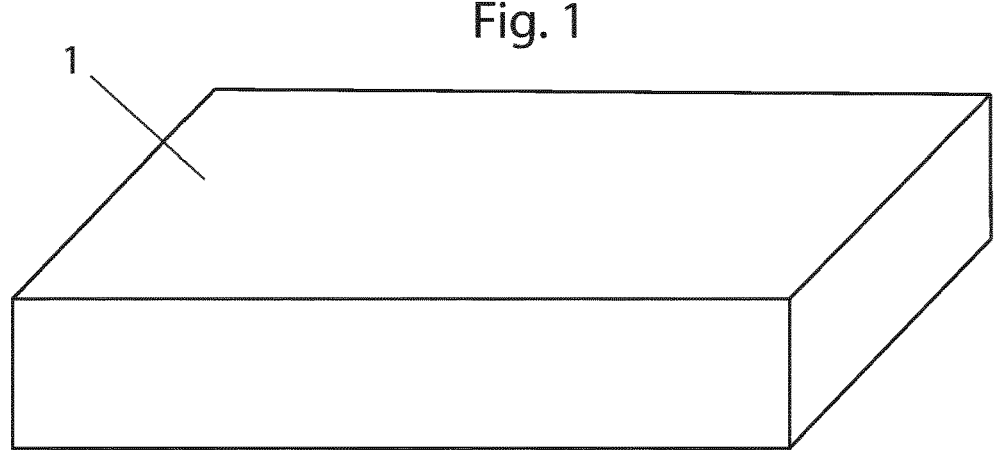
FIG. 2 shows a schematic diagram of a substrate 1, for example in the form of plastic, in particular polycarbonate, polyester amide, polyether imide, ABS, technical thermoplastics or duroplast. Alternatively, the substrate 1 could also consist of glass.
Figure 3:
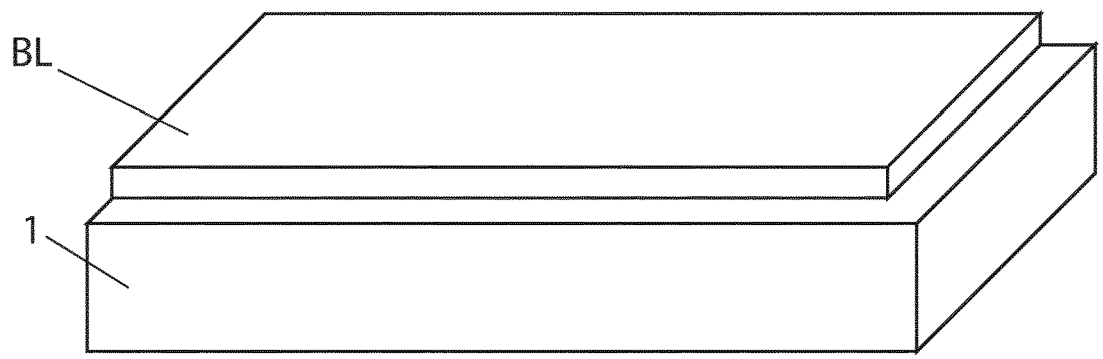
FIG. 3 shows a schematic diagram of the substrate 1 comprising a base layer BL which can optionally be provided and can be used to prepare the substrate 1 optimally for the subsequent coating processes.
Figure 4:
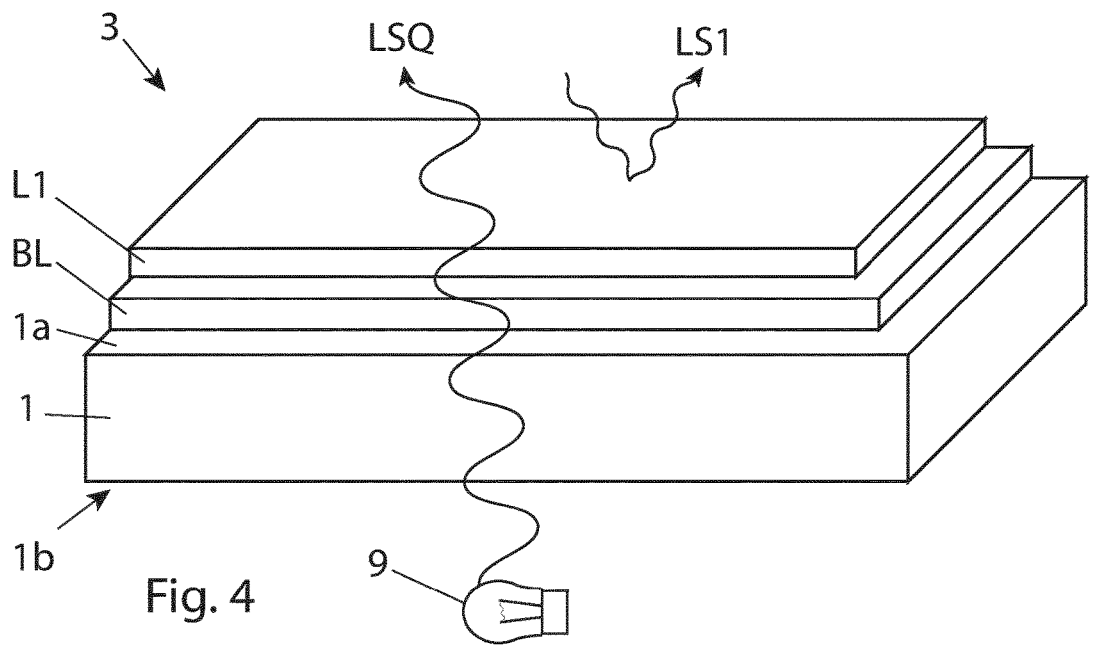
Figure 5:
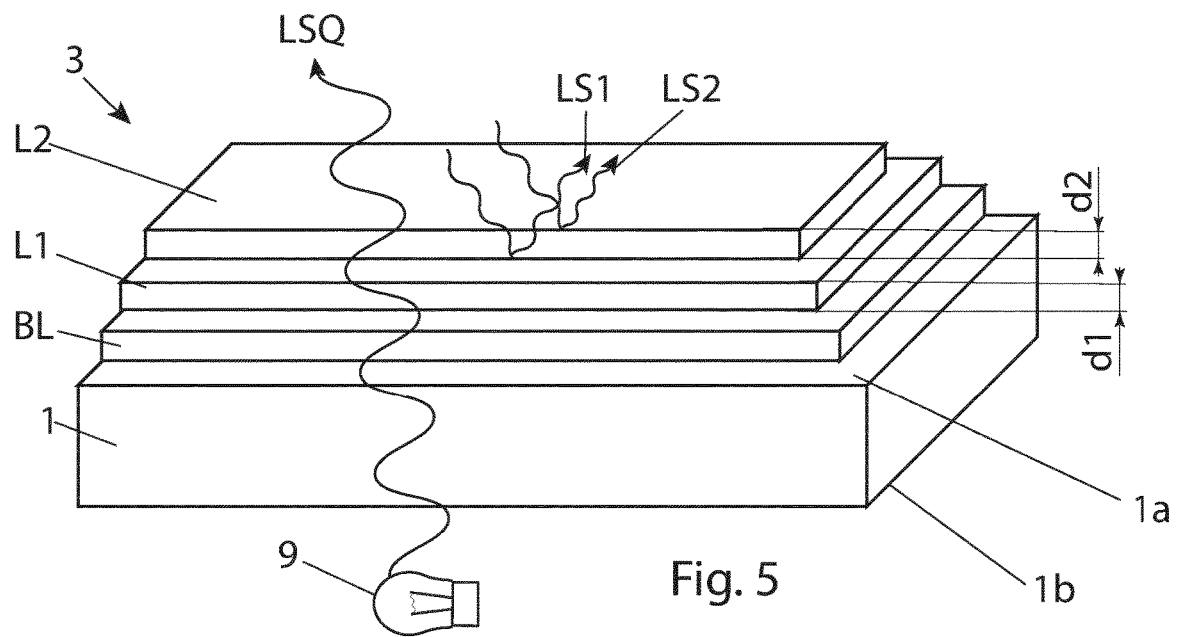

FIG. 4 shows a schematic diagram of the substrate 1 comprising a base layer BL and the aforementioned first layer L1 according to the invention. FIG. 5 shows a schematic diagram of the substrate 1 comprising a base layer BL, the first layer L1 and the second layer L2 according to the invention. FIG. 5 also shows the aforementioned light beams LS1 and LS2, which are superimposed on each other; the colour of the light reflected by the design element 3 can be influenced by the superimposition. The colour influence depends both on the choice of the layer materials and of the layer thicknesses d1 and d2.

The application and formation of the first layer L1 according to step C can take place without a reactive gas during the sputtering process. The temperature in steps B and C can be less than 100° C., preferably less than 70° C., particularly preferably less than 60° C.

The application of the second colouring layer L2 according to step D can take place by sputtering while adding a reactive gas, in particular oxygen. For example, a second layer L2 can be obtained by providing titanium by means of a sputtering target, said titanium reacting with oxygen as the reactive gas introduced into the sputtering process and thus forming a titanium dioxide layer on the first layer L1, the layer thickness of the second layer L2 being defined by specification of the coating rate and/or the duration of the coating process.

Figure 6:
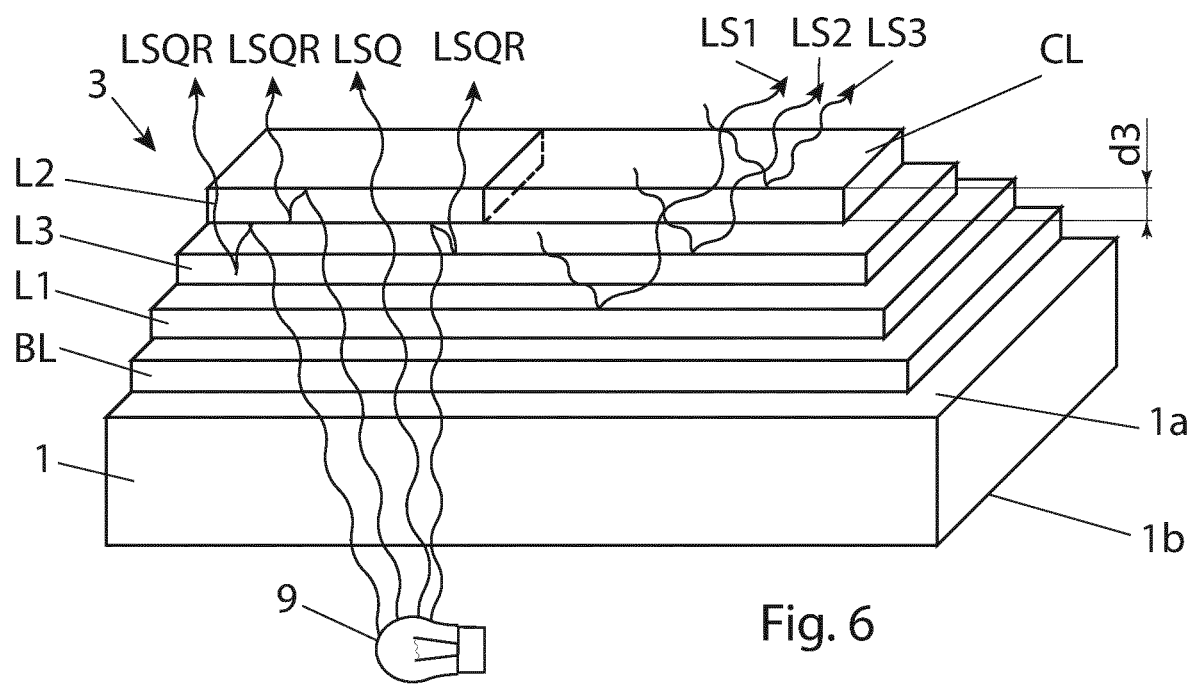

FIG. 6 shows a schematic diagram of the substrate 1 comprising a base layer BL, the first layer L1, the second layer L2 and a protective layer CL (coat layer) or an effect reflective layer L3 according to the invention. The protective layer CL is applied by means of plasma polymerisation, and this protective layer CL can in particular be a layer consisting of hexamethyldisiloxane. This protective layer CL is transparent but still significantly involved in colouring, depending on the layer thickness d3, since light LS3 is also reflected by this layer at the boundary face to the surrounding medium (e.g. air), and the reflected light beams LS1 and LS2 are superimposed on said light. In addition, the provision of the protective layer CL changes the reflection behaviour of the second layer L2 and thus of the light beams LS2 insofar as the protective layer CL has a relative permittivity different from air. The protective layer CL can thus be designed such that the light reflected by the motor vehicle design element 3 is manipulated in its colour composition by destructive interference of at least one spectral component of the light. The effect reflective layer can in principle have exactly the same structure as the first layer L1. It can therefore consist of the same material.

FIGS. 4 to 6 show a motor vehicle design element 3 which is produced by the method according to the invention, wherein the motor vehicle design element 3 comprises the dimensionally stable substrate 1 on which a colouring first metallic reflective layer L1 is applied, wherein either this layer L1 is designed such that a semi-transparent layer with a layer thickness of at least 2 nm is achieved, or a second colouring layer L2 is provided, which covers the first layer L1, wherein the second layer L2 is at least partially light-permeable and is designed such that light incident on the design element 3 is at least partially manipulated by interference in that the light beams LS2 which are reflected by the surface of the second layer L2 are superimposed on the light beams LS1 which are reflected by the surface of the first layer L1. The second layer L2 can be largely free of body colours, a body colour being a colour which becomes perceptible by at least partial absorption of spectra of visible light, the extent of the absorption of the colour components red, green and blue being unequal, wherein the second layer L2 is designed such that the light reflected by the motor vehicle design element 3 is manipulated in its colour composition by interference of at least one spectral component of the light.

As can be seen in FIGS. 4 to 6, the first layer L1 is designed such that the first layer L1 reflects light which is incident on the first layer L1 from the front side 1a towards the rear side 1b of the substrate 1. These figures also show a light source 9, from which light beams LSQ are shone through the substrate 1 from the rear side 1a towards the front side 1b and through the subsequent layers.

Figure 11:
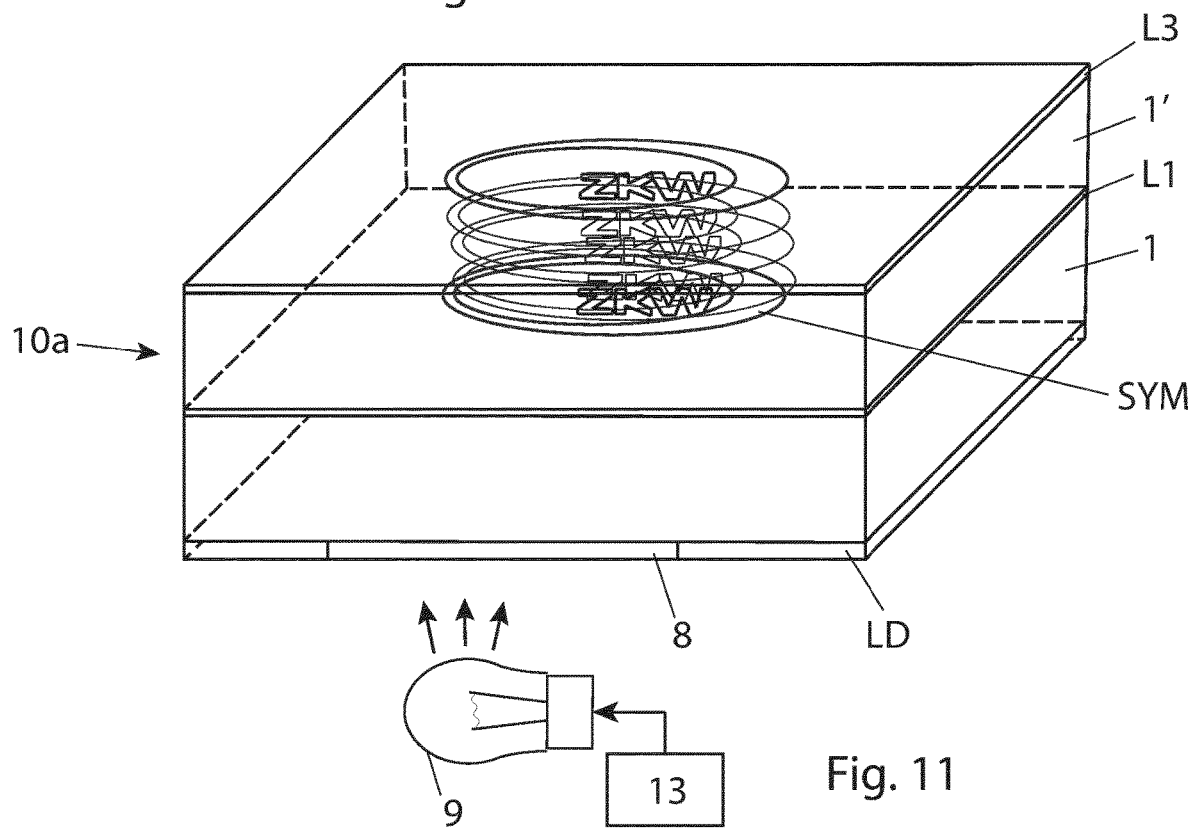
Figure 12A:
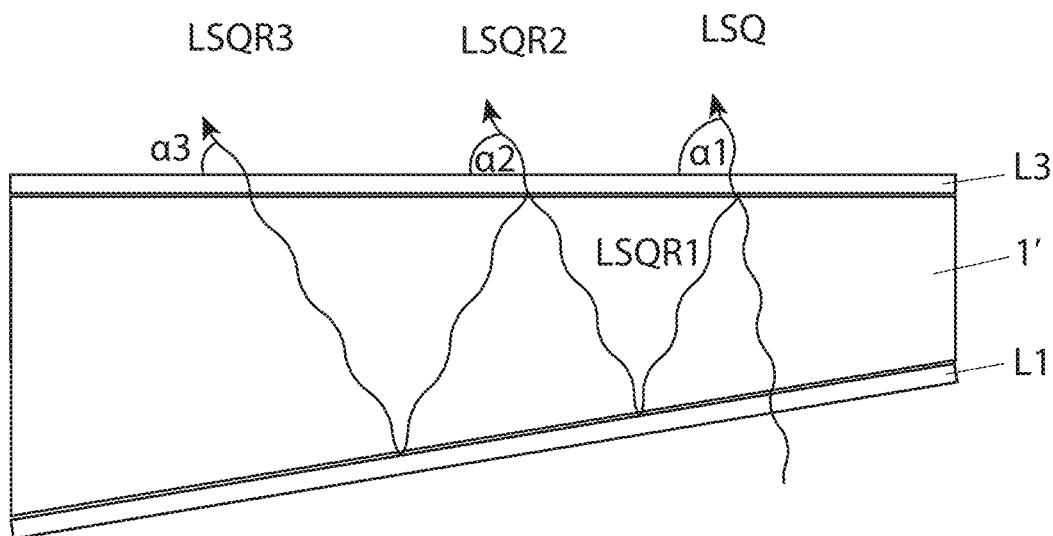
Figure 12B:
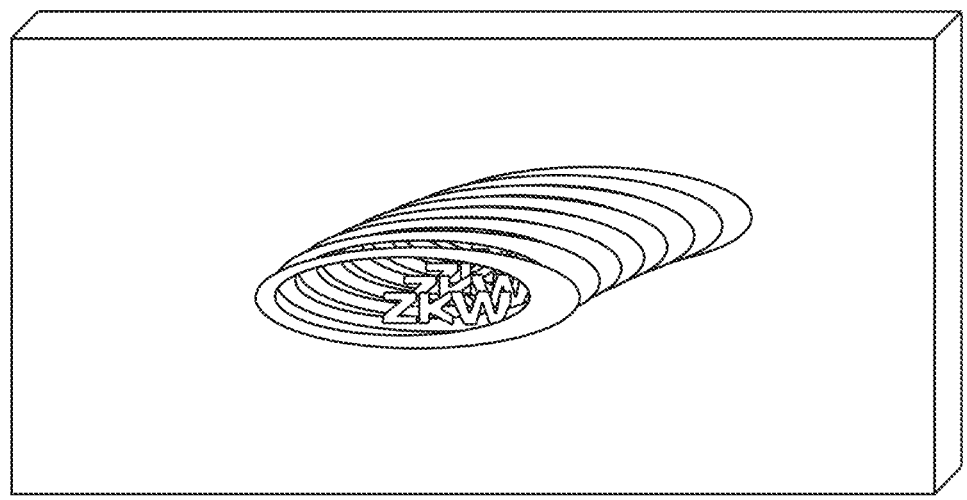

Alternatively but also additionally to the second layer L2 and to the protective layer CL, an effect reflective layer L3 can be provided between the first layer L1 and the second layer L2 (or the protective layer CL); the optical effect of said effect reflective layer is discussed in more detail in conjunction with FIGS. 11, 12a and 12b. In short, the effect reflective layer L3 allows a partial back-reflection of the light beams passing through the first layer L1 from the rear side 1b towards the front side 1a, towards the first layer. Exemplary reflected light beams LSQR are shown in FIG. 6.

In other words, FIG. 6 shows that a protective layer CL can be applied by means of plasma polymerisation over the first layer L1 or optionally over a second layer L2 covering the first layer L1, said protective layer being in particular a layer consisting of hexamethyldisiloxane. The protective layer CL can be designed such that the light reflected by the motor vehicle design element 3 is manipulated in its colour composition by interference of at least one spectral component of the light. Before application of a first layer L1 according to step C, a base layer BL can also be applied to the substrate 1.

Figure 7A:
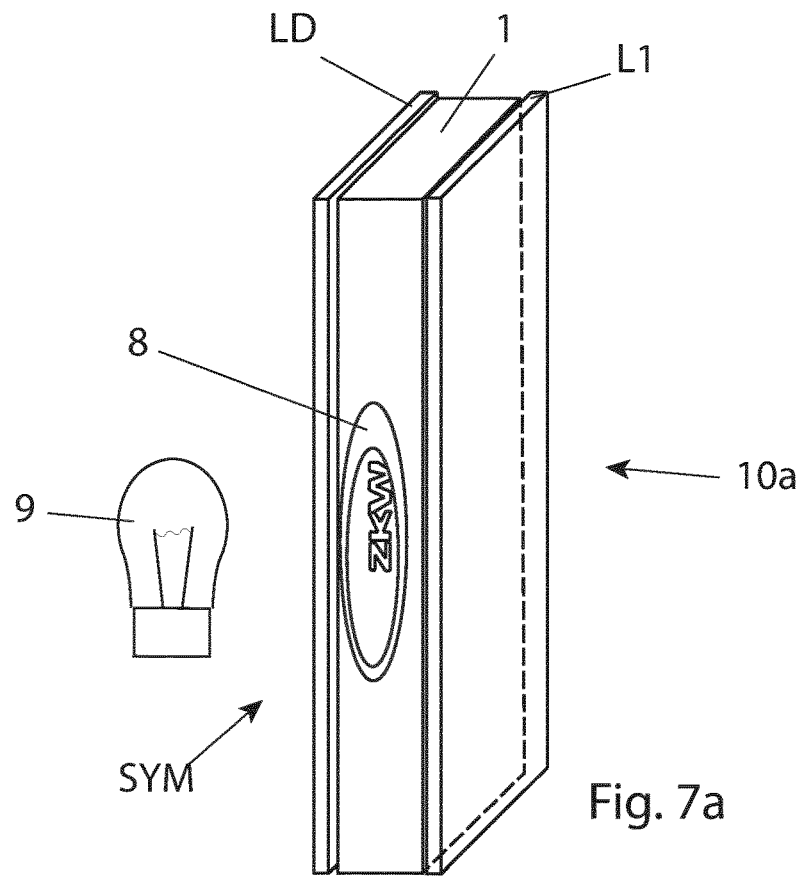
Figure 7B:
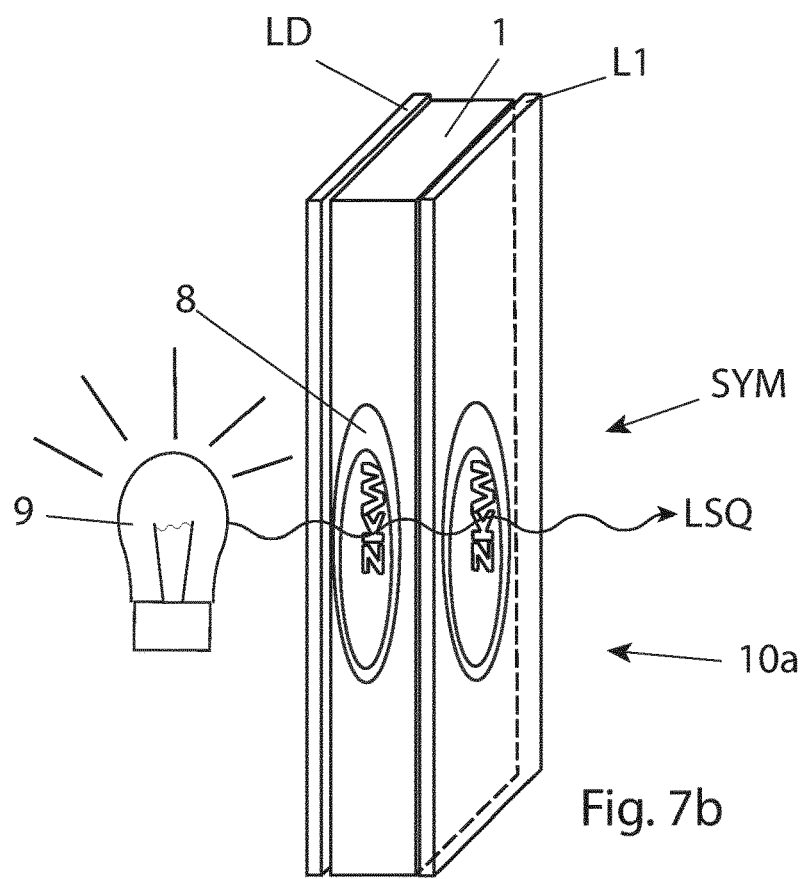

In this way, a motor vehicle design element 3 can be created in which, according to FIGS. 7a and 7b, a light-absorbent cover layer LD is arranged on a front or rear side 1a, 1b of the dimensionally stable substrate 1, wherein the light-impermeable cover layer LD contains at least one light-permeable opening 8 for reproducing at least one graphical symbol SYM, wherein the cover layer LD is placed in front of the metallic semi-transparent first layer L1 in a direction from the rear side 1b towards the front side 1a of the substrate 1 such that light passing through the at least one opening 8 in the light-impermeable cover layer LD from the rear side 1b towards the front side 1a of the substrate 1 is incident on the metallic semi-transparent first layer L1 and at least partially passes outwards through the metallic semi-transparent first layer L1 in order to project the at least one graphical symbol SYM represented by the at least one opening 8.

FIGS. 7a and 7b show a schematic diagram of a display element 10a according to the invention, comprising a light-impermeable cover layer LD, in a passive and an active operating state, respectively. More precisely, FIG. 7a shows the display element 10a in a passive state—also referred to as a cold state—in which a light source 9 designed for illuminating the opening 8 in the cover layer LD is switched off. In FIG. 7b, in contrast, this light source 9 is switched on, i.e. in an active state—also referred to as a warm state—as a result of which the symbol SYM is projected towards the front side of the display element 10a. In the warm state, the symbol SYM is therefore visible for a viewing direction from the front side. In the cold state, however, the symbol SYM is not perceptible with the naked eye. In this way, information can be hidden and in certain situations displayed in a display element—which can also be used as a design element. In the example according to FIGS. 7a and 7b, a company logo is displayed—in the present case the logo of the company "ZKW". Alternatively, however, technical symbols such as markings on a fuel tank cap, warning signs, technical information etc. can also be projected.

In principle, a light-absorbent cover layer LD can be applied on the front side 1a or rear side 1b of the substrate 1, the light-impermeable cover layer LD containing at least one light-permeable opening 8 to reproduce at least one graphical symbol SYM. Method steps B and C are carried out such that light LSQ passing through the at least one opening 8 in the light-impermeable cover layer LD from the rear side 1b towards the front side 1a of the substrate 1 is incident on the first metallic semi-transparent layer L1 and at least partially passes outwards through the first metallic semi-transparent layer L1 to project the at least one graphical symbol SYM represented by the at least one opening 8.

The light-impermeable cover layer LD can be applied by means of a PVD process, and the at least one light-permeable opening 8 can be exposed by lasering.

The light-impermeable cover layer LD can alternatively likewise be in the form of a film. The light-impermeable cover layer LD can be arranged on the rear side 1b of the substrate 1. Alternatively, the light-impermeable cover layer LD can be arranged on the front side 1b of the substrate 1 if the further layers L1 etc. follow on the front side 1b.

The first layer L1 can be arranged directly on the light-absorbent cover layer LD. The light-impermeable cover layer LD can be completely light-impermeable.

The display or signalling element 10a, 10b can be obtained by the described method according to the invention and comprises a light source 9 which is designed to shine light from the rear side 1b of the substrate 1 through the front side 1a of the substrate 1 and through the at least one opening 8 in the cover layer LD onto the first layer L1 and at least partially through same. The light source 9 is preferably a controllable light source, in particular an RGB light source, wherein the light intensity and/or light colour of the controllable light source 9 can be changed over time. To implement a driving direction indicator (also referred to colloquially as "blinker"), the light source 9 and the at least one opening 8 and the first layer L1 are designed such that, when intermittently illuminated by the light source 9, an intermittent orange driving-direction-indicating signal can be emitted outwards.

Figure 8:
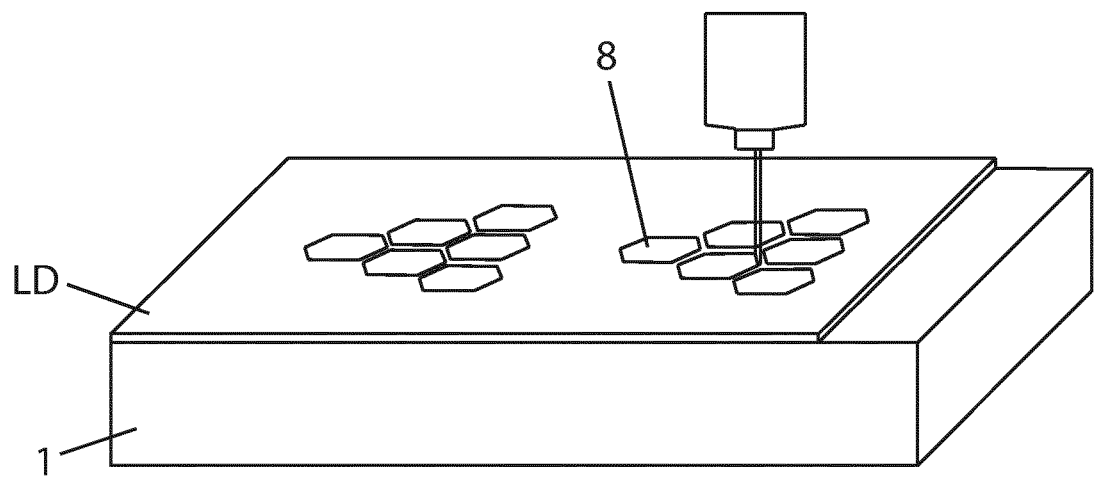

FIG. 8 shows an exemplary method for forming an opening 8 in a light-absorbent cover layer LD. In the present example, this opening 8 is exposed by lasering. Alternatively or additionally, films which enclose a light-permeable opening can also be adhesively bonded.

Figure 9A:
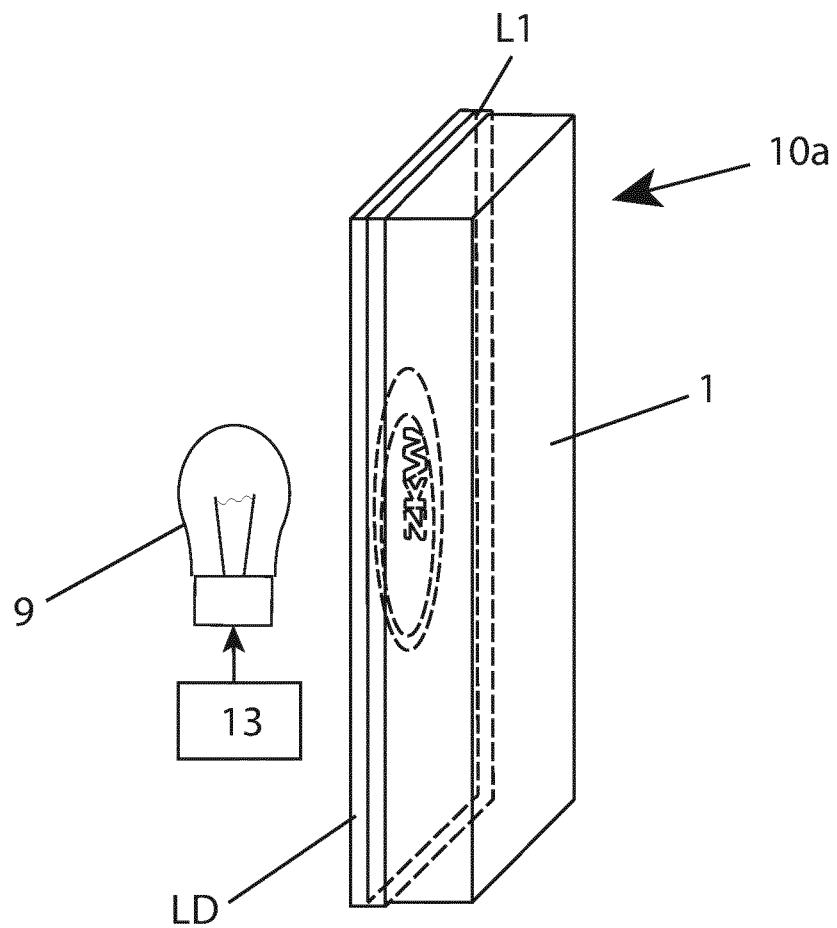
Figure 9B:
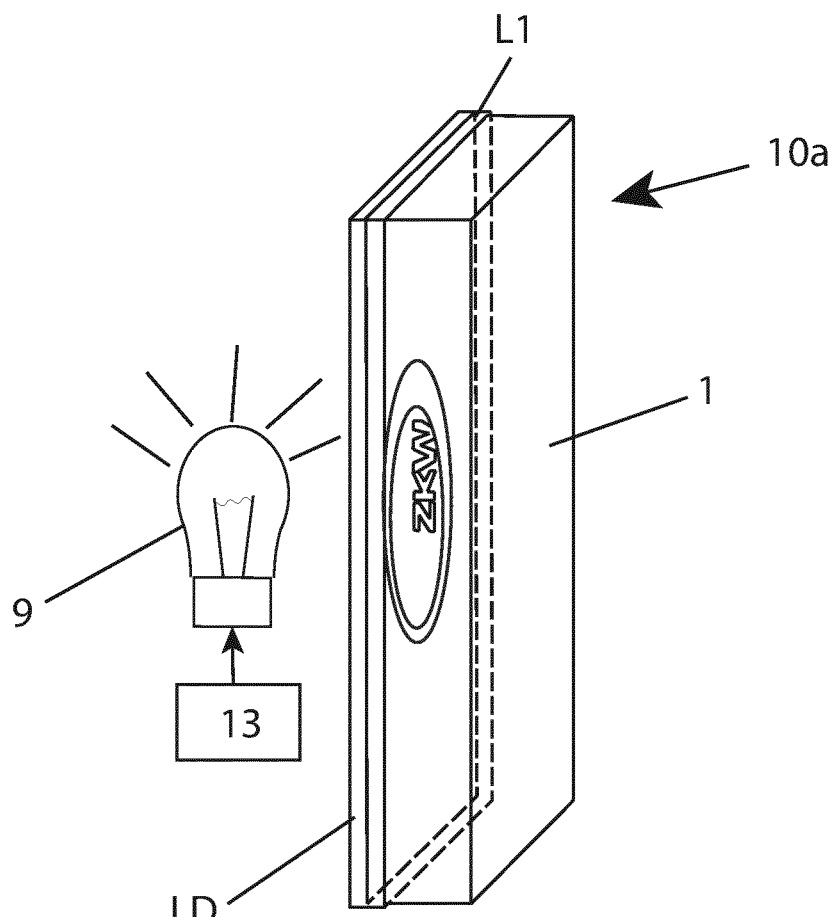

FIGS. 9a and 9b show alternative designs of a display element 10b according to the invention, in a passive and an active operating state, respectively. For example, both the cover layer LD and the first layer L1 are arranged on the rear side 1b of the substrate in said figures. Alternatively, the first layer L1 could also be arranged on the front side 1a of the substrate 1. The first layer L1 has a layer thickness d1 between 2 nm and 300 nm. It is selected to be so low that the semi-transparent function of this layer is ensured. The light source 9 is assigned a control device 13 (see FIGS. 9a, 9b and 11), which is designed to switch the light source 9 on and off for predefinable durations and thereby change the optical appearance of the display or signalling element 10a, 10b between at least two states.

Figure 10A:
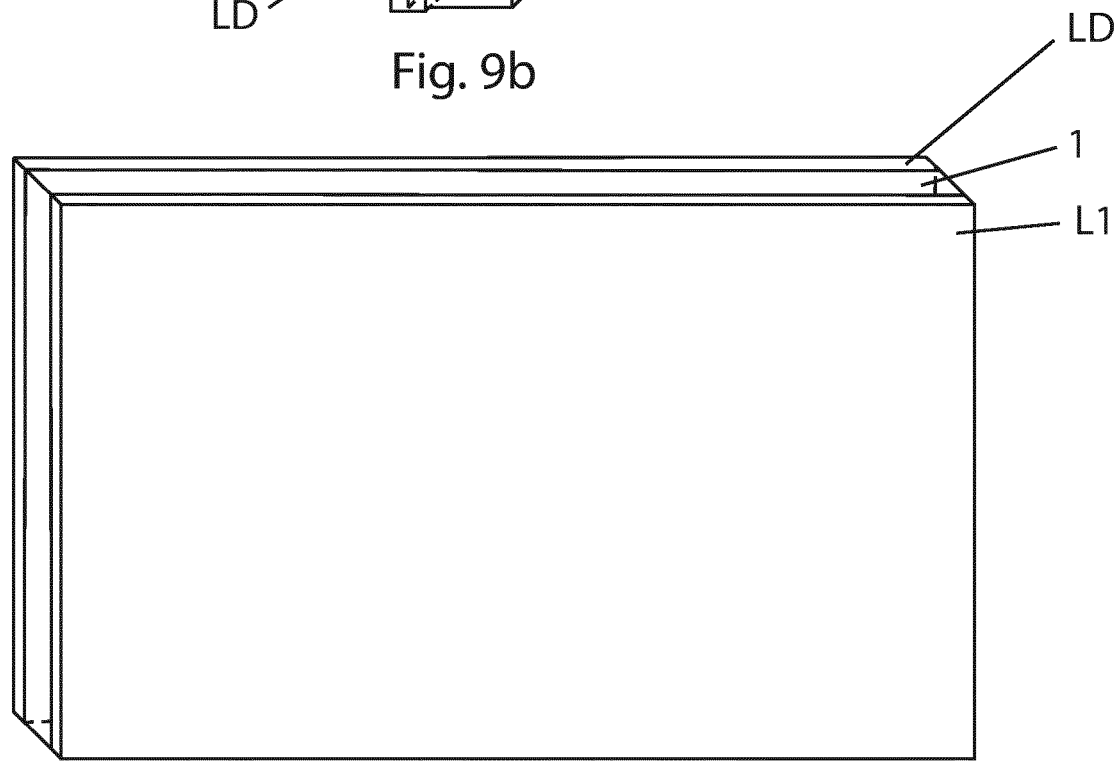
Figure 10B:
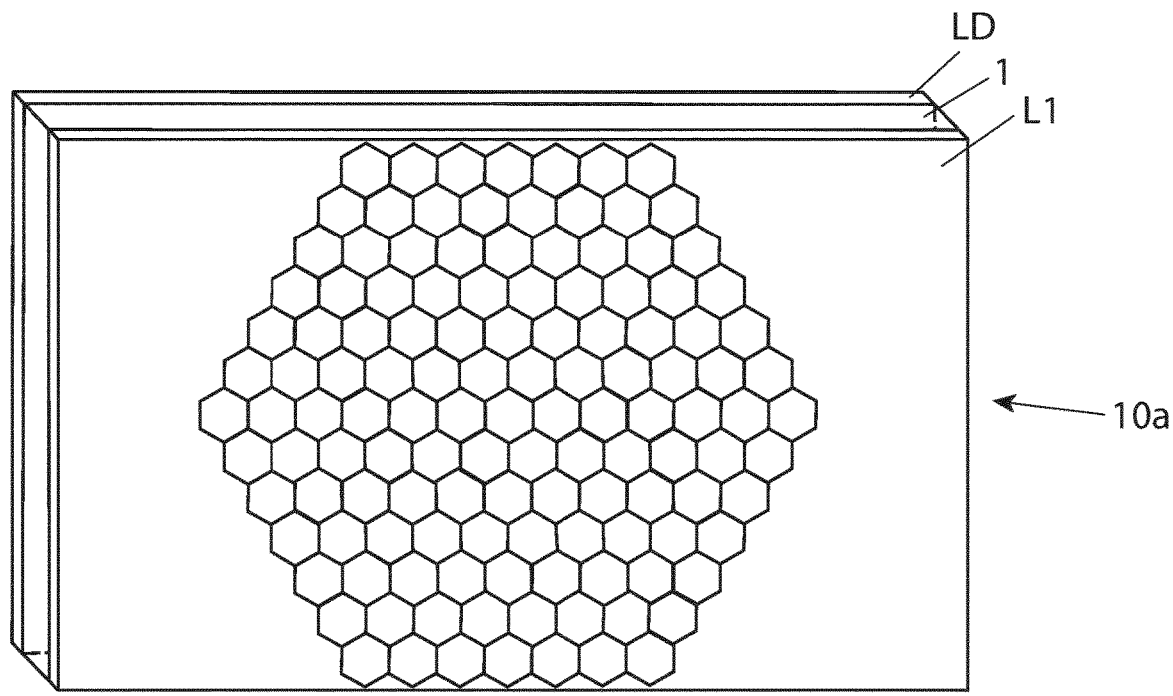

FIGS. 10a and 10b show a further alternative design of a display element 10a according to the invention, in a passive operating state (FIG. 10a) and an active operating state (FIG. 10b). It can be seen in FIG. 10a that the first layer L1 and optionally a second layer L2 are designed such that light incident on the layers from the front side 1a towards the rear side 1b of the substrate 1 is reflected such that the at least one opening 8 provided 1a in the light-absorbent cover layer LD is not visible to the human eye if there is no backlighting. A display element 10a or signalling element 10b can be produced in that it comprises a motor vehicle design element 3 according to the invention and at least one light source 9, the light source 9 being designed to shine light outwards through the at least one rear side 1b of the substrate 1 and through the front side 1b of the substrate 1 and in the process to illuminate the semi-transparent first layer L1.

FIG. 11 shows a variant of a display element 10b according to the invention comprising an effect reflective layer L3. In said variant, a semi-transparent effect reflective layer L3 is arranged after the first layer L1, viewed in a direction oriented from the rear side towards the front side 1a of the substrate 1, to partially reflect light beams LSQR back to the first layer L1, said effect reflective layer L3 being arranged at a distance of at least 1 mm from the first layer L1, light-permeable material 1' (can be the same material as e.g. the material of the substrate 1) being arranged between the effect reflective layer and the first layer so that light beams passing through the first layer L1 from the rear side 1b towards the front side 1a of the substrate 1 can be reflected between the first layer L1 and the effect reflective layer L3 and can be emitted outwards through the effect reflective layer L3. As long as the effect reflective layer L3 and the first layer are oriented parallel to each other as shown in FIG. 11, a plurality of projections or mirror images of the symbol lying one behind the other are produced, depending on the viewing direction of an observer, wherein the intensity of each subsequent mirror image decreases.

It can be provided for the effect reflective layer L3 to have a reflectance of at least 70% in respect of light which is incident from the front side 1a towards the rear side 1b of the substrate 1. It can likewise be provided for the effect reflective layer L3 to have a transmittance of at least 80% in respect of light which enters the effect reflective layer L3 from the front side 1a towards the rear side 1b of the substrate 1.

FIGS. 12a and 12b show exemplary effects of an inclination of the effect reflective layer LD of a display element 10a. The first layer L1 and the effect reflective layer L3 are inclined to each other at least in some sections so that the angles of the reflected light beams LSQR are changed starting from the incident light beam LSQ at the angle α1 towards the reflected light beams LSQR1 to LSQR3 at the associated angles α2 and α3. The mirror images can be distorted and shifted, depending on the differently selected inclination of the layers to one another. FIG. 12b shows exemplary mirror images which have a hologrammatic appearance.

Figure 13:
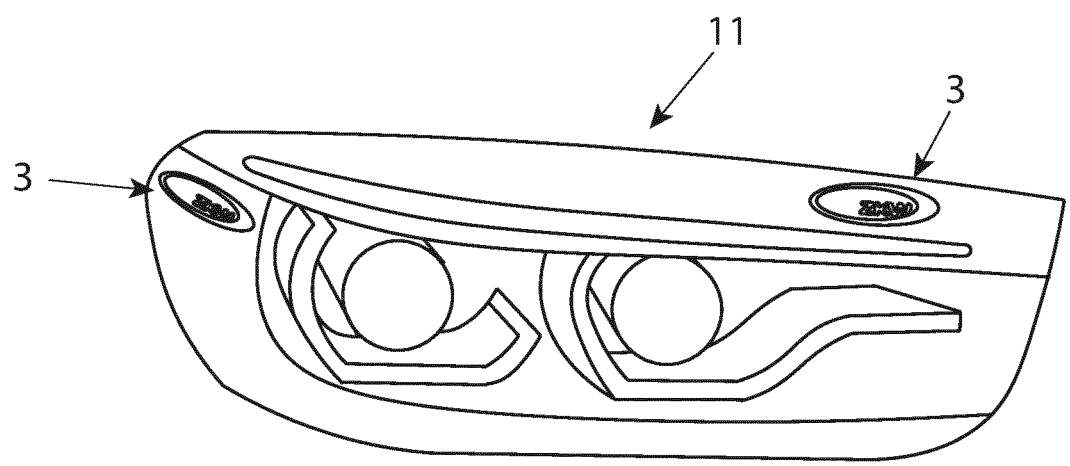

FIG. 13 shows a motor vehicle headlight 11 according to the invention comprising two motor vehicle design elements 3, which are each perceptible by a projection of the ZKW logo in the motor vehicle headlight 11. This projection can be switched on and off and thus made visible and invisible by switching a light source (not shown) on and off.

Figure 14A:
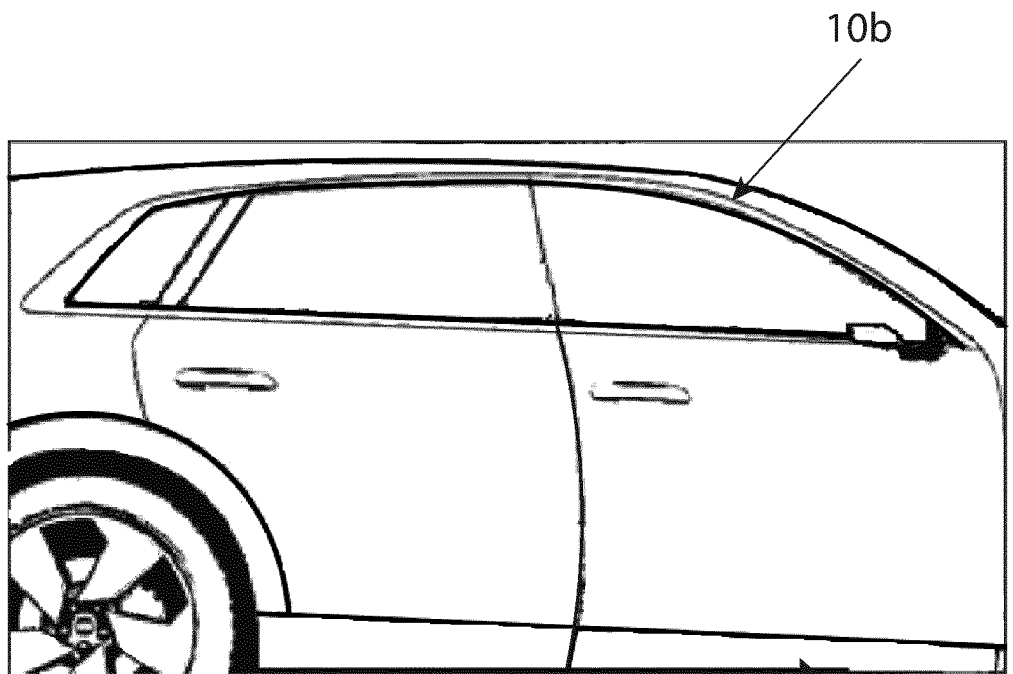
Figure 14B:
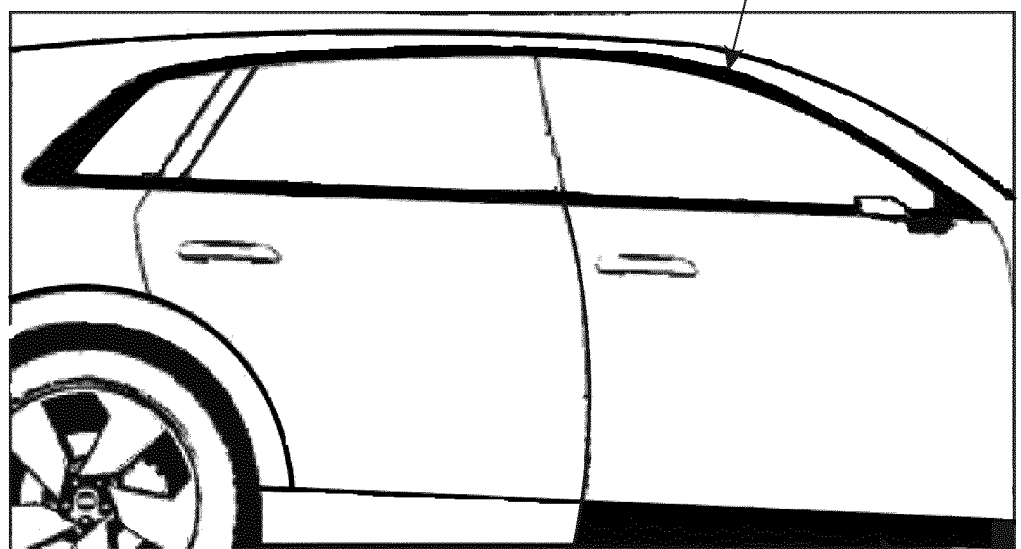

FIGS. 14a and 14b show a motor vehicle comprising exemplary signalling elements 10b according to the invention, in a passive and an active operating state, respectively. The signalling element can be in the form of a trim strip which surrounds the window panes and, for example, has a chrome colour in the passive operating state and assumes a light colour, e.g. white, red, green, blue or mixtures thereof, in the active operating state. The colour in the active state depends on the shape of the design element 3 and on the colour of the light source 9. Multi-coloured light sources 9 can also be used, which are designed to emit different light colours and can be controlled in their colour and/or intensity. Such a signalling element 10b can also be installed in the door entry strip or in a door strip or sill which is visible from the outside. The design elements 3 or the display elements 10a and signalling elements 10b resulting therefrom can in principle be used in any way corresponding to design wishes or else to provide a technical purpose.

FIGS. 15a and 15b show a signalling element 10b according to the invention in the form of a flashing light integrated in a rear-view mirror, FIG. 15a showing the cold state and FIG. 15b showing the warm state.

Figure 16:
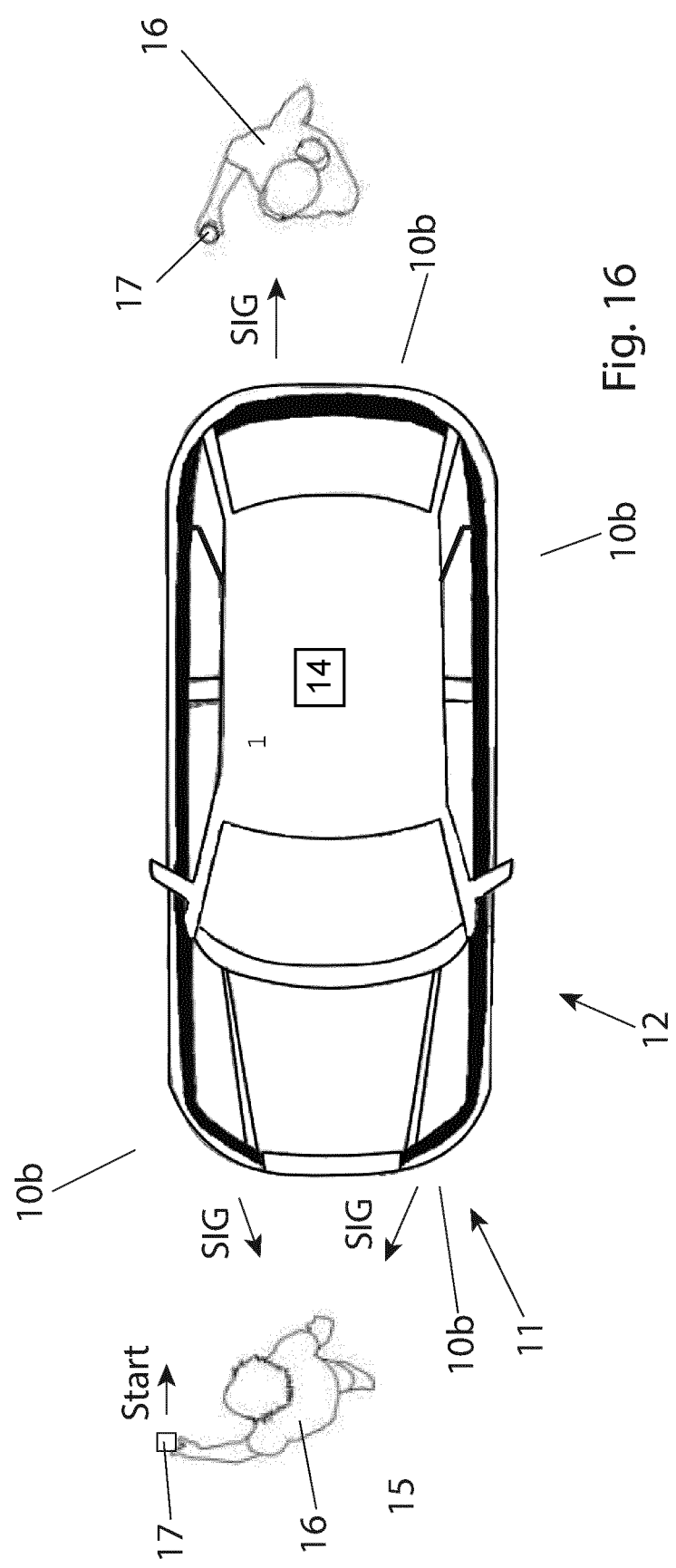

FIG. 16 shows an exemplary motor vehicle 12 comprising a number of signalling elements 10b according to the invention for use in a check routine.

The motor vehicle 12 comprises vehicle headlights 11 comprising a motor vehicle design element 3 according to the invention and/or a display element 10a or signalling element 10b according to the invention. In addition, the motor vehicle comprises various signalling elements 10b and/or a vehicle headlight 11.

The motor vehicle 12 has at least one sensor 14 (see FIG. 16, arranged centrally on the vehicle 1 by way of example; in practice, however, a plurality of sensors is typically used to cover the surroundings of the vehicle, which sensors are distributed along the vehicle and can be integrated for example in the radiator grille, the front of the vehicle or else in the vehicle headlight) for sensing the surroundings 15 of the vehicle, at least one display or signalling element 10a, 10b and at least one control device 13, which is connected to the at least one sensor 14 and the display or signalling element 10a, 10b, for activating the light source 9 of the display or signalling element 10a, 10b. The control device 13 is designed, depending on persons 16 sensed within the surroundings 15 of the vehicle by means of the at least one sensor 14, to activate the light source 9 of the display or signalling element 10a, 10b for visual signal transfer Sig towards the sensed person 16. Preferably, the motor vehicle 12 has multiple sensors 14 and multiple display or signalling elements 10a, 10b, wherein each sensor 14 is assigned a display or signalling element 10a, 10b, wherein the control device 13 is designed to start a check routine of the sensors 14 depending on a start signal "start", which can be sent for example via a vehicle key 17, wherein a walk around the vehicle 12 by a person 16 walking around the vehicle 12 is sensed by means of the sensors 14 during the check routine, wherein display and/or signalling elements 10a, 10b facing the person 16 are switched between at least two optical states, in particular an active and a passive state, according to a predefinable pattern depending on a result of the sensor check, so that the functional state of the sensors 14 can be communicated visually to the person 16 checking the vehicle 12.

FIG. 16 thus shows a situation in which a person 16 is walking around a vehicle 12 equipped with sensors 14, for example an autonomous vehicle. In this case, the functionality of the sensors 14 is of utmost importance. The walk around the vehicle can interact with a check routine such that e.g. each sensor is assigned at least one display or signalling element 10a or 10b. If a sensor does not detect the person 16 although it should detect them in this situation (this information can be determined e.g. by comparison with the other sensors), an error signal can be output. If, however, all the sensors are functional, the display or signalling element 10a or 10b facing the walking person can be lit up, for example in the colour green, one after the other, for example in the manner of a chaser light effect, wherein for example a closed illuminated green ring lights up around the vehicle to indicate proper functioning of the sensors when the walk around the vehicle is complete. In this way, a functional check—for example required by law—of the sensor system can be carried out in an intuitive and simple manner while the vehicle is at a standstill.

All the device features arising from the method can also be part of the devices mentioned.

In view of this teaching, the person skilled in the art is able to arrive at other embodiments of the invention which are not shown, without exercising inventive skill. Therefore, the invention is not limited to the embodiments shown but defined by the entire scope of the claims. Individual aspects of the invention or the embodiments can also be taken and combined with one another. Any reference signs in the claims are exemplary and are used only for easier readability of the claims without limiting them.

The invention claimed is:

1. A method for producing a semi-transparent motor vehicle design element (3), comprising the following steps:

A providing a dimensionally stable, light-permeable substrate (1) which is heat-resistant for a temperature of at least 60° C., the substrate (1) having a front side (1a) and a rear side (1b), B introducing the substrate (1) into a vacuum chamber (2) and applying a first metallic semi-transparent layer (L1) by means of a PVD process to the substrate (1) according to step a) which is situated in the vacuum chamber (2), wherein the first metallic semi-transparent layer (L1) has a transmittance ranging between 10% and 90%, C applying a light-impermeable cover layer (LD) to the front or rear side (1a, 1b) of the substrate (1), the light-impermeable cover layer (LD) containing at least one light-permeable opening (8) for reproducing at least one graphical symbol (SYM), wherein steps B and C are carried out such that light (LSQ) passing through the at least one opening (8) in the light-impermeable cover layer (LD) from the rear side (1b) towards the front side (1a) of the substrate (1) is incident on the first metallic semi-transparent layer (L1) and at least partially passes outwards through the first metallic semi-transparent layer (L1) in order to project the at least one graphical symbol (SYM) represented by the at least one opening (8); and D applying a colouring second layer (L2) which covers the first metallic semi-transparent layer (L1), the colouring second layer (L2) being designed such that light incident on the design element (3) from the front side (1a) towards the rear side (1b) of the substrate (1) is manipulated by destructive interference, in that light beams (LS2) which are reflected by the surface of the colouring second layer (L2) are superimposed on light beams (LS1) which are reflected by the surface of the first metallic semi-transparent layer (L1), wherein the colouring second layer (L2) is substantially free of body colours, wherein the colouring second layer (L2) is designed such that the light reflected by the motor vehicle design element (3) is manipulated in its colour composition by interference of at least one spectral component of the light, wherein in contrast a body colour being a colour which becomes perceptible by at least partial absorption of spectra of visible light, the extent of the absorption of the colour components red, green and blue being unequal, and wherein a semi-transparent effect reflective layer (L3) is arranged between the first metallic semi-transparent layer (L1) and the colouring second layer (L2), viewed in a direction oriented from the rear side towards the front side (1a) of the substrate (1), to partially reflect light beams (LSQR) back to the first metallic semi-transparent layer (L1), wherein said effect reflective layer (L3) is arranged at a distance of at least 1 mm from the first metallic semi-transparent layer (L1), wherein a light-permeable material (1') is arranged between the effect reflective layer (L3) and the first metallic semi-transparent layer (L1) so that light beams passing through the first metallic semi-transparent layer (L1) from the rear side (1b) towards the front side (1a) of the substrate (1) can be reflected between the first metallic semi-transparent layer (L1) and the effect reflective layer (L3) and can be emitted outwards through the colouring second layer (L2).

2. The method according to claim 1, wherein the first metallic semi-transparent layer (L1) has a reflectance of at least 50% and/or a transmittance of at most 50% in a light propagation direction from the front side (1a) towards the rear side (1b) of the substrate (1).

3. The method according to claim 1, wherein the first metallic semi-transparent layer (L1) has a reflectance of at most 80% and/or a transmittance of at least 20% in a light propagation direction from the rear side (1b) towards the front side (1a) of the substrate (1).

4. The method according to claim 1, wherein the effect reflective layer (L3) has a reflectance of at least 50% in respect of light which is incident from the front side (1a) towards the rear side (1b) of the substrate (1).

5. The method according to claim 1, wherein the effect reflective layer (L3) has a transmittance of at least 50% in respect of light which enters the effect reflective layer (L3) from the front side (1a) towards the rear side (1b) of the substrate (1).

6. The method according to claim 1, wherein the first metallic semi-transparent layer (L1) and the effect reflective layer (L3) are inclined to each other at least in some sections in order to change angles ($\alpha_2$, $\alpha_3$) of the light beams (LSQR2, LSQR3) reflected between these layers.

7. The method according to claim 1, wherein the PVD process according to step B) is designed as a sputtering process, and wherein the application of the colouring second layer (L2) according to step D) takes place by sputtering while adding a reactive gas, in particular oxygen.

8. The method according to claim 7, wherein the colouring second layer (L2) is obtained by providing titanium by means of a sputtering target, said titanium reacting with oxygen as the reactive gas introduced into the sputtering process and thus forming a titanium dioxide layer on the first metallic semi-transparent layer (L1), the layer thickness of the colouring second layer (L2) being predefined by predefining the sputtering rate and/or the duration of the sputtering process.

9. The method according to claim 1, wherein the first metallic semi-transparent layer (L1) and optionally a colouring second layer (L2) are designed such that light incident on the layers from the front side (1a) towards the rear side (1b) of the substrate (1) is reflected such that the at least one opening (8) provided in the light-impermeable cover layer (LD) is not visible to the human eye if there is no backlighting.

10. The method according to claim 1, wherein a protective layer (CL) is applied by means of plasma polymerisation over the first metallic semi-transparent layer (L1) or optionally over the colouring second layer (L2) covering the first metallic semi-transparent layer (L1), wherein the protective layer (CL) is designed such that the light reflected by the motor vehicle design element (3) is manipulated in its colour composition by interference of at least one spectral component of the light.

11. The method according to claim 10, wherein the protective layer (CL) consists of hexamethyldisiloxane.

12. The method according to claim 1, wherein the side of the substrate (1) to be coated with the first metallic semi-transparent layer (L1) has a surface design which is smooth at least in one section and is rough or structured in at least one other section.

13. A method for producing a display or signalling element (10a, 10b) for a motor vehicle headlight, comprising:
    providing a motor vehicle design element (3) produced by a method according to claim 1, and at least one light source (9), and
    emitting light, via the light source (9), outwards through the at least one rear side (1b) of the substrate (1) and through the front side (1b) of the substrate (1) to illuminate the first metallic semi-transparent layer (L1).

14. The method according to claim 13, wherein the light source (9) is assigned a control device (13) which is designed to switch the light source (9) on and off for predefinable durations and thereby change the optical appearance of the display or signalling element (10a, 10b) between at least two states.

15. A method for producing a semi-transparent motor vehicle design element (3), comprising:
    A providing a dimensionally stable, light-permeable substrate (1) which is heat-resistant for a temperature of at least 60° C., the substrate (1) having a front side (1a) and a rear side (1b);
    B introducing the substrate (1) into a vacuum chamber (2) and applying a first metallic semi-transparent layer (L1) by a PVD process to the substrate (1) according to step A which is situated in the vacuum chamber (2);
    C applying a light-impermeable cover layer (LD) to the front or rear side (1a, 1b) of the substrate (1), the light-impermeable cover layer (LD) containing at least one light-permeable opening (8) for reproducing at least one graphical symbol (SYM), wherein steps B and C are carried out such that light (LSQ) passing through the at least one opening (8) in the light-impermeable cover layer (LD) from the rear side (1*b*) towards the front side (1*a*) of the substrate (1) is incident on the first metallic semi-transparent layer (L1) and at least partially passes outwards through the first metallic semi-transparent layer (L1) in order to project the at least one graphical symbol (SYM) represented by the at least one opening (8); and D applying a colouring second layer (L2) which covers the first metallic semi-transparent layer (L1), the colouring second layer (L2) being designed such that light incident on the design element (3) from the front side (1*a*) towards the rear side (1*b*) of the substrate (1) is at least partially manipulated by destructive interference, in that the light beams (LS2) which are reflected by the surface of the colouring second layer (L2) are superimposed on the light beams (LS1) which are reflected by the surface of the first metallic semi-transparent layer (L1), and wherein the colouring second layer (L2) is substantially free of body colours, wherein the colouring second layer (L2) is designed such that the light reflected by the motor vehicle design element (3) is manipulated in its colour composition by interference of at least one spectral component of the light, wherein in contrast a body colour being a colour which becomes perceptible by at least partial absorption of spectra of visible light, the extent of the absorption of the colour components red, green and blue being unequal, wherein a semi-transparent effect reflective layer (L3) is arranged after the first metallic semi-transparent layer (L1), viewed in a direction oriented from the rear side towards the front side (1*a*) of the substrate (1), to partially reflect light beams (LSQR) back to the first metallic semi-transparent layer (L1), wherein said effect reflective layer (L3) is arranged at a distance of at least 1 mm from the first metallic semi-transparent layer (L1), wherein a light-permeable material (1') is arranged between the effect reflective layer (L3) and the first metallic semi-transparent layer (L1) so that light beams passing through the first metallic semi-transparent layer (L1) from the rear side (1*b*) towards the front side (1*a*) of the substrate (1) can be reflected between the first metallic semi-transparent layer (L1) and the effect reflective layer (L3) and can be emitted outwards through the effect reflective layer (L3).

* * * * *